Sept. 18, 1934. C. H. TANGER Re. 19,322

REFRIGERATION

Original Filed Aug. 9, 1930

Sewell, Inc., assignee of Clifton H. Tanger, deceased, by Louis Rothenberg President

BY

Jos. J. Stellmach

ATTORNEY

Reissued Sept. 18, 1934

Re. 19,322

UNITED STATES PATENT OFFICE 19,322

REFRIGERATION

Chelton H. Tanger, deceased, late of Evansville, Ind., by Servel, Inc., New York, N. Y., a corporation of Delaware, assignee Original No. 1,873,508, dated August 23, 1932, Serial No. 474,152, August 9, 1930. Application for reissue July 19, 1934, Serial No. 736,110

17 Claims. (Cl. 62—108.5)

This invention relates to refrigeration and more particularly to devices for forming ice cubes so that they may be quickly removed from the receptacle in which they are formed. Particularly the invention contemplates a flexible cover for an ice tray which will not retard the freezing action of ice cubes and which will serve as a receptacle or holder for them when they are removed and permit ready individual detachment for use.

The invention will be hereinafter more particularly described with reference to the accompanying drawing forming a part of this application.

Figure 1:
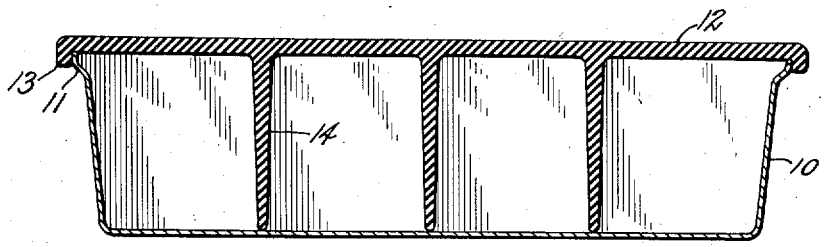
Figure 2:
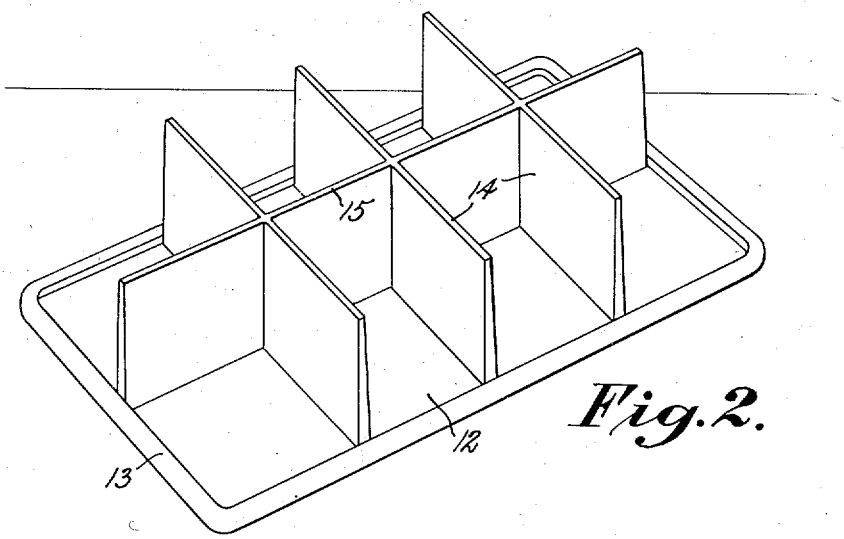

In said drawing:

Fig. 1 is a longitudinal section illustrating one application of the invention;

Fig. 2 an inverted perspective; and

Figure 3:
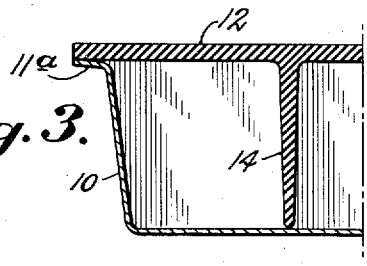

Fig. 3 a fragmentary detail section.

Referring to the drawing, 10 indicates a metal tray of conventional construction having a hip or shoulder 11, this hip or shoulder at the side of the tray being adapted to engage supporting ledges, not shown. The tray may be supported by having its bottom rest directly on and in contact with a shelf. The metal tray 10 ordinarily receives a metal partition member not shown, and is filled with water or other substance to be frozen for forming cubes. The said metal tray per se forms no part of the present invention.

The invention comprises a flexible cover 12 which has a depending marginal flange 13, and a depending grid formed by transverse and longitudinal partition webs 14 and 15 respectively tapered from edge to edge as shown. The marginal flange 13 serves to maintain the cover on the tray in proper position, and while it is shown extending entirely around the edge of the cover, obviously it may be of shorter length. The depending webs or partition members 14 and 15 are preferably formed integrally with the body of the cover 12, as shown, and are of such length that they contact the bottom of the metal tray with which the cover is used. This causes a complete separation of the cubes formed in the tray. The depending webs or partition members are tapered outwardly from the cover 12 and are of the proper thickness consistent with durability and utility. The body of the cover is also formed of a thickness to afford sufficient rigidity to permit it to be held in the proper position, but of sufficient thinness to permit it to be bent up at the corner to afford an opening through which water may be added to fill any unused part of the tray. The cover is preferably formed of a pure Para rubber or similar material which is soft and flexible. This permits the entire tray with cover to be removed from the freezing compartment of a refrigerator, and to be held under a faucet to loosen the cubes from the tray so that the metal tray can be removed. The cubes may then be held on the inverted cover and one or more may be detached and removed as desired. On account of the depending partition members being flexible when the cubes freeze, the said depending members or flanges will yield and deformity of the metal tray and bulging of the ice above the tray will be prevented and the cubes will not be wedged as tightly within the tray as in the case where the ordinary metal partition member is used.

In Fig. 3 is shown a metal tray 10 provided with no hip or shoulder 11 but with an outwardly turned supporting flange 11*a*. Also the flexible cover 12 is devoid of the depending flange 13 so that it terminates flush with the edge of the flange 11*a*. This construction permits the tray with cover to be slid into a tighter compartment without the flange of the cover interfering.

It will be obvious to those skilled in the art that various other modifications may be made in the device without departing from the spirit of the invention, and the invention is not limited to merely what is shown and described, but only as indicated in the appended claims.

What is claimed is:

1. A cover for an ice tray, said cover being formed of flexible non-metallic material and provided with depending partition forming projections also of flexible non-metallic material.

2. A device of the class described comprising a flexible non-metallic body and flexible non-metallic projections depending from said body adapted to form separate chambers when the body is placed on an ice tray.

3. The combination of a metal tray for containing material to be frozen, a non-metallic cover for said tray formed of flexible material, and flexible non-metallic webs depending from said cover for defining independent compartments within said tray.

4. The combination of a metal tray for containing material to be frozen, a non-metallic cover for said tray formed of flexible non-metallic material, and flexible non-metallic webs depending from said cover for defining independent compartments within said tray, said webs being of a length to engage the bottom of the tray when the cover is in position.

5. The combination of a metal tray for containing material to be frozen, a non-metallic cover for said tray formed of flexible non-metallic material, flexible non-metallic webs depending from said cover for defining independent compartments within said tray, said webs being of a length to engage the bottom of the tray when the cover is in position, and a marginal flange formed on the cover for maintaining the cover in proper position relative to the tray.

6. The combination with a tray having good heat conducting properties and adapted to contain material to be heated or cooled, of a cooperating cover for said tray formed of flexible material having poor heat conducting properties, flexible non-metallic webs depending from said cover into contact with said tray and defining independent compartments within said tray.

7. A cover for a metal ice tray, said cover being formed of flexible non-metallic material and having an ice tray grid of similar material carried thereby and depending therefrom, said grid being formed of tapered members.

8. A cover for an ice tray, said cover being formed of flexible material and provided with flexible depending partition forming projections.

9. The combination of a tray for containing matter to be frozen, a cover for said tray formed of flexible material, and flexible webs depending from said cover for defining independent compartments within the tray.

10. The combination of a tray for containing matter to be frozen, a cover for said tray formed of flexible material, and flexible webs depending from said cover for defining independent compartments within the tray, said webs being of a length to engage the bottom of the tray when the cover is in position.

11. The combination of a tray for containing matter to be frozen, a cover for said tray formed of flexible material, flexible webs depending from said cover for defining independent compartments within the tray, and a marginal flange formed on the cover for maintaining the cover in proper position relative to the tray.

12. The combination with a tray having good heat-conducting properties and adapted to contain matter to be heated or cooled, of a cooperating cover for the tray formed of flexible material having poor heat-conducting properties, flexible webs depending from said cover into contact with the tray and defining independent compartments within the tray.

13. A cover for an ice tray, said cover being formed of flexible material and having an ice tray grid of similar material supported in depending relation therefrom, said grid being formed of tapered members.

14. A device for forming ice including a lower metal member and an upper member of flexible non-metallic material, said upper member having depending partition forming projections of flexible non-metallic material.

15. A device for forming ice including a lower metal member and an upper member of flexible non-metallic material, said upper member having depending partition forming projections of flexible non-metallic material, and said upper and lower members cooperating to form closed spaces for water to be frozen.

16. A device for forming ice including a lower metal member and an upper member of flexible non-metallic material, said upper and lower members having parallel portions and said upper part having depending partition forming projections of flexible non-metallic material.

17. A device for forming ice including a lower metal member and an upper member of flexible non-metallic material, said upper and lower members having parallel portions, said upper part having depending partition forming projections of flexible non-metallic material, and said upper and lower members cooperating to form closed spaces for water to be frozen.

SERVEL, INC.,
*Assignee of Chelton H. Tanger, Deceased,*
By LOUIS RUTHENBURG,
*President.*